United States Patent
Thomaschewski

(10) Patent No.: US 8,576,409 B2
(45) Date of Patent: Nov. 5, 2013

(54) METHOD FOR MEASURING THE INTERNAL SPACE OF AN AIRCRAFT

(75) Inventor: Oliver Sascha Thomaschewski, Hamburg (DE)

(73) Assignee: Lufthansa Technik AG, Hamberg (DE)

( * ) Notice: Subject to any disclaimer, the term of this patent is extended or adjusted under 35 U.S.C. 154(b) by 573 days.

(21) Appl. No.: 12/554,524

(22) Filed: Sep. 4, 2009

(65) Prior Publication Data

US 2010/0091300 A1    Apr. 15, 2010

(30) Foreign Application Priority Data

Sep. 4, 2008 (DE) .......................... 10 2008 045 746

(51) Int. Cl.
G01B 11/24 (2006.01)
G01C 7/06 (2006.01)

(52) U.S. Cl.
USPC ............ 356/601; 356/607; 356/608; 356/636

(58) Field of Classification Search
USPC .............. 356/601–614, 625–636, 5.01, 4.01, 356/141.5; 235/454, 455, 459
See application file for complete search history.

(56) References Cited

U.S. PATENT DOCUMENTS

| | | | | |
|---|---|---|---|---|
| 4,355,904 A * | 10/1982 | Balasubramanian | ......... | 356/608 |
| 4,419,012 A * | 12/1983 | Stephenson et al. | ....... | 356/141.5 |
| 4,866,626 A * | 9/1989 | Egli | .............................. | 701/207 |
| 4,967,092 A * | 10/1990 | Fraignier et al. | ......... | 250/559.07 |
| 5,440,392 A * | 8/1995 | Pettersen et al. | .............. | 356/620 |
| 5,884,239 A * | 3/1999 | Romanik, Jr. | ................. | 702/150 |
| 6,266,142 B1 * | 7/2001 | Junkins et al. | ................ | 356/623 |
| 6,648,273 B2 * | 11/2003 | Anast | ............................ | 244/119 |
| 6,931,149 B2 * | 8/2005 | Hagene et al. | ................ | 382/141 |
| 7,046,356 B2 * | 5/2006 | Bondurant | ................ | 356/241.1 |
| 7,164,476 B2 * | 1/2007 | Shima et al. | ............... | 356/241.1 |
| 7,341,188 B2 * | 3/2008 | Aiki et al. | ..................... | 235/454 |
| 7,380,752 B2 * | 6/2008 | Guard et al. | ............... | 244/118.5 |
| 7,557,914 B2 * | 7/2009 | Thompson et al. | ........ | 356/241.1 |
| 7,612,878 B2 * | 11/2009 | Frey | .......................... | 356/241.1 |
| 7,847,922 B2 * | 12/2010 | Gittinger et al. | ............. | 356/4.01 |
| 2003/0043964 A1 | 3/2003 | Sorenson | | |
| 2003/0164952 A1 * | 9/2003 | Deichmann et al. | .......... | 356/603 |
| 2006/0180648 A1 | 8/2006 | Miller et al. | | |
| 2007/0171394 A1 * | 7/2007 | Steiner et al. | ................ | 356/5.01 |
| 2008/0084558 A1 * | 4/2008 | Thompson et al. | ........ | 356/241.1 |

FOREIGN PATENT DOCUMENTS

| | | |
|---|---|---|
| DE | 19741730 A1 | 4/1999 |
| DE | 10150436 A1 | 3/2003 |
| DE | 102005012107 A1 | 9/2006 |

* cited by examiner

*Primary Examiner* — Sang Nguyen
(74) *Attorney, Agent, or Firm* — Baker & Hostetler LLP

(57) ABSTRACT

A method for measuring the internal space of an elongate body. The elongate body has in a global xyz-coordinate system a longitudinal axis x. A laser profile scan is carried out, in which a laser scanner, which carries out scans in a plane, is moved through the internal space of the elongate body. The scan plane is tilted about the y-axis by a tilt angle $\alpha$ or about the z-axis by a tilt angle $\gamma$. Preferably, the scan plane is tilted about the y-axis and the z-axis corresponding to the global coordinate system of the internal space. An apparatus for carrying out the method.

23 Claims, 9 Drawing Sheets

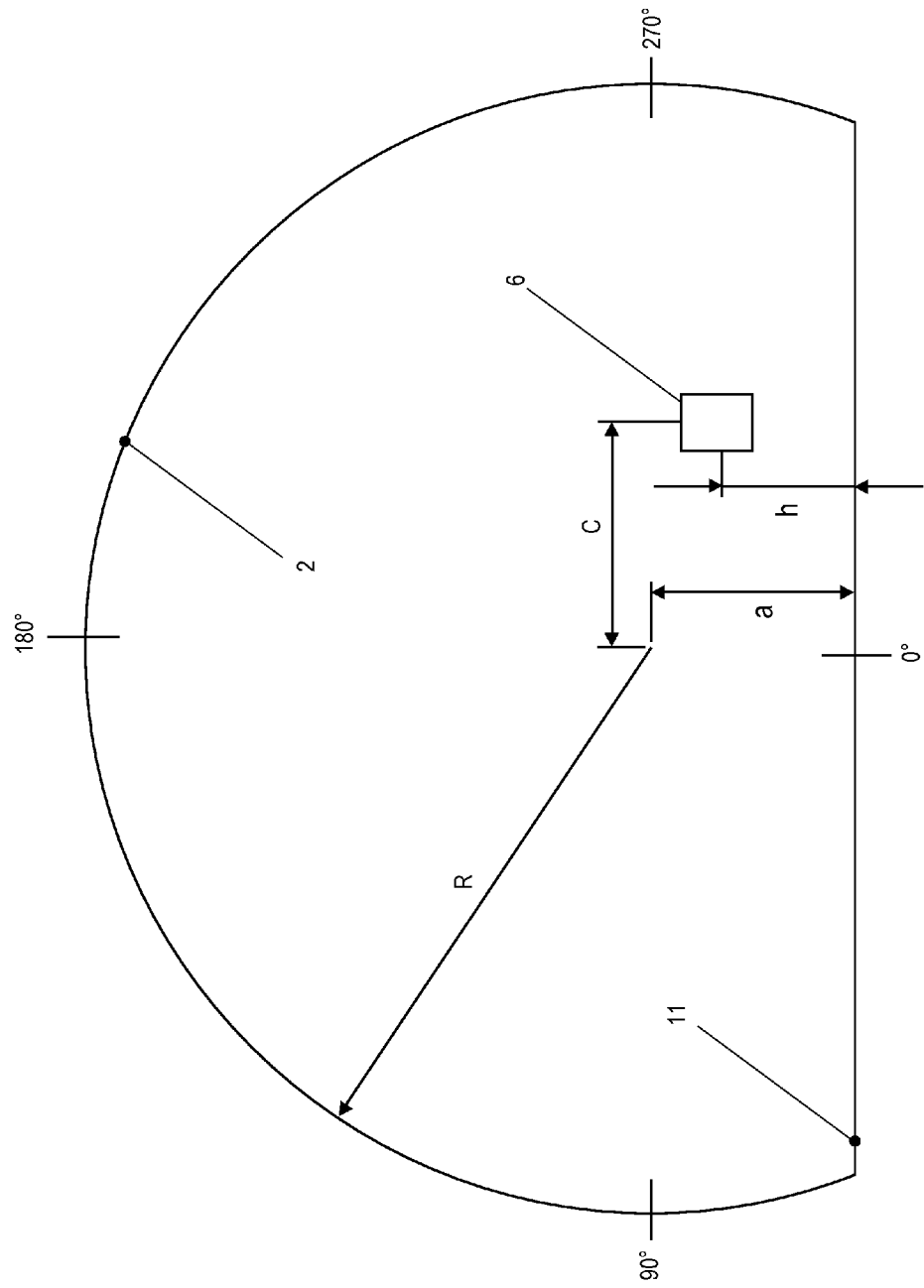

METHOD FOR MEASURING THE INTERNAL SPACE OF AN AIRCRAFT

REFERENCE TO RELATED APPLICATIONS

This application claims the priority of German Patent Application No. 10 2008 045 746.9, filed Sep. 4, 2008, the contents of which are incorporated herein by reference.

FIELD OF THE INVENTION

The invention relates to a method for measuring the internal space of an elongate body as broadly disclosed herein.

BACKGROUND OF THE INVENTION

When planning the interior design of an aircraft, it is necessary to know exactly the three-dimensional geometry of the fuselage or fuselage segment in which the interior fittings are meant to be fitted.

So-called laser scans of internal spaces are known from prior public use. Generally, a sphere-shaped scan is carried out here, in which a stationary laser is pivoted about two axes, and the measurement beam scans the internal space in a so-called spherical scan. Information relating to the distance of the reflection site can be obtained either on the basis of the delay time of the reflected measurement beam or, preferably, on the basis of its interference. In an internal space of, for example, an aircraft, which is typically approximately cylindrical, the quality of the measurement points thus obtained varies widely since measurements with a shallow angle of incidence of the measurement beam or a larger distance between location of the laser and point of incidence of the measurement beam typically have a larger error.

Likewise known from prior public use is a so-called profile measurement or profile scan. The measurement beam is, in such a profile measurement, allowed to rotate about only one axis in a plane, the plane typically being perpendicular with respect to the longitudinal axis of the internal space to be measured. The measurement laser is moved during the profile measurements or between profile measurements on said longitudinal axis or parallel thereto. During such a profile scan, the measurement beam generally impinges at right angles or nearly at right angles on the areas to be measured, with the result that an improved measurement quality is attained.

SUMMARY OF THE INVENTION

The invention is based on the object of providing a method of the type mentioned in the introduction, which allows a measurement of in particular elongate internal spaces which is simple and of high quality. The invention achieves said object by tilting the scan plane about the y-axis by a tilt angle $\alpha$ and/or about the z-axis by a tilt angle $\gamma$, preferably about the y-axis and the z-axis, out of the global coordinate system of the internal space.

It is possible, according to the invention, to efficiently measure with largely homogeneous resolution a typically approximately cylindrical internal space for example of an aircraft. Since both angle of incidence and distance of incidence of the measurement beam onto the regions to be measured are subject to less variation than in the case of the spherical scan of the prior art, the method according to the invention has an assessable and relatively small measurement error. The point clouds themselves, which are obtained by the measurements, are impractical in data-technology terms and only difficult to manage. According to the invention, so-called meshes are produced on the basis thereof preferably by a so-called meshing operation, with the meshes describing the internal space measured and being used as the basis for further processing. Due to its homogeneous and relatively small error and owing to extensive illumination even of undercuts, as described below, the invention allows the provision of good base data for the calculation of such a mesh.

To begin with, some terms used within the invention should be explained. The method according to the invention serves for measuring the internal space of an elongate body. Said elongate body can be, for example, the fuselage of an aircraft, a railroad car or the like. It can thus refer to the internal spaces of transport means, in particular. An imaginary right-angled coordinate system is spanned in said internal space. The longitudinal axis x of said coordinate system points in the longitudinal direction, generally the direction of travel in transport means. The y-axis is the horizontal axis perpendicular to the x-axis and points for example in an aircraft in the direction of the wings. The z-axis is the vertical axis. Said coordinate system is referred to as the global coordinate system of the internal space and is illustrated diagrammatically in FIG. 2. If the scan plane 8 illustrated in FIG. 2 is rotated about the y-axis out of the yz-plane (reference number 9), said tilt angle is designated $\alpha$. If the scan plane is rotated about the vertical axis z out of the yz-plane, the corresponding angle is designated $\gamma$ (not illustrated in FIG. 2).

According to the invention, a laser profile scan is carried out. This term refers to an operation in which the measurement beam of the laser is rotated about an axis and thus effects a measurement in a plane. In order to obtain a complete image of the internal space, the laser scanner is moved, during or between profile scans, through the internal space, for example parallel with respect to the x-axis. The invention provides for the scan plane to be tilted about the y-axis by a tilt angle $\alpha$ and/or about the z-axis by a tilt angle $\gamma$, preferably about the y-axis and the z-axis out of the global coordinate system of the internal space. This means that the scan place does not coincide with a plane which is spanned by the axes of the global coordinate system, for example not with the generally vertical yz-plane. Tilting about at least one of said axes refers to tilting about at least one axis of said global coordinate system. In a tilting action about the y-axis, the scan plane tilts for example out of the vertical yz-plane of the global coordinate system. According to the invention, the scan plane can be tilted about two or all three axes of said global coordinate system. By way of example, tilting about the y- and z-axes of the global coordinate system is preferred. Additional tilting about the x-axis can become meaningful for example if, owing to the design, the scanner housing shadows the measurement beam and thus interferes with the intended measurement.

Tilting said scan plane has the advantage that any undercuts in the surface to be scanned can in this way be illuminated better. By aligning the scan plane at an oblique angle relative to the yz-plane, the measurement beams strike the frequently approximately cylindrical surface of the internal space not at a right angle, but at an angle which depends on the tilting of the scan plane. Unlike in a so-called spherical scan, however, said angle is substantially the same across the entire internal space to be measured, with the result that the measurement accuracy for all regions of the internal space is also substantially consistent.

Due to the fact that the measurement beam generally strikes the area of the internal space to be measured at an oblique angle, any undercuts can be illuminated better and included in the measurement-technological recording. Such undercuts can be, for example, holders or other attachment devices for equipment or furnishings to be installed in the internal space. Since the measurement of the internal space is usually used in the preparation or planning of an interior design, the measurement-technological recording of such regions of the internal space, which are relevant for installation purposes, frequently is of particular importance.

The laser scanner is moved, according to the invention, through the internal space. The direction of movement is preferably orientated on the longitudinal axis x of the internal space and can be substantially parallel to said longitudinal axis. Preferably, this is a straight line, but according to the invention a movement which deviates from a straight line is likewise conceivable. The general direction of the movement path, however, is generally orientated on the longitudinal axis x of the internal space even in a movement which deviates from a straight line.

The movement of the laser scanner can be carried out, according to the invention, by multiple manual relocation of the laser scanner inside the internal space to be measured between the laser scans. It is preferred, however, if the laser scanner has a movable device, such as a vehicle, or is mounted thereon. Such a vehicle can be configured to be freely movable through the internal space, for example can move freely on the cabin floor of an internal aircraft space. It can be preferred, however, if a defined guide or a defined travel path for said vehicle is provided. Said travel path can utilize already existing devices in the internal space, for example the seat rails for mounting seats on the cabin floor in an aircraft. However, it can likewise be a travel path which can be installed temporarily in the internal space to be measured, such as rails, ropes spanned through the internal space or the like.

The location of the laser scanner during a measurement in the coordinate system of the internal space to be measured must be known in order to evaluate the measurement results. According to the invention, a means, which is already known in the prior art, for location and orientation tracking of the laser scanner in the internal space is used for this purpose. In the case of manually securing the laser scanner between the measurements, the laser scanner can be positioned for each measurement at a previously defined and thus known location. If the laser scanner is preferably arranged on a vehicle, some of the spatial coordinates of the laser scanner can already be pre-specified by the rail-bound guidance of the travel path. Further spatial coordinates on the movement path can be determined, for example, by mechanical systems which detect and evaluate, for example, markings on the travel path or have wheel rotary transmitter sensors on the vehicle. By way of example, inclination sensors, which detect inclination, tilting or yawing while the vehicle is moved, may additionally be present. The measurement accuracy can be significantly enhanced also by the detection of such inclination, tilting and yawing movements.

Location tracking of the laser scanner can furthermore be effected by optical systems known in the prior art, such as so-called laser tracking. Furthermore possible is location tracking by way of acoustic or other electromagnetic waves, such as by means of ultrasound, radar, satellite positioning systems such as GPS or differential GPS or the like.

In one preferred embodiment, the laser scanner is moved at least twice through the internal space and the scan plane is tilted, in both scans, by a different angle out of the coordinate system out of the yz-plane of the coordinate system of the internal space. This means that in both scans the measurement beam strikes the area to be measured from different angles. Tilting can be effected, according to the invention, about the y-axis by an angle $\alpha$ and/or about the z-axis by an angle $\gamma$. It is preferred, according to the invention, if the completed tilting includes an angle component $\alpha$, that is to say in this case the scan plane is in any case also titled about the y-axis out of the yz-plane by an angle $\alpha$. It can further be preferred if, while the internal space is scanned twice, tilting is effected exclusively about the y-axis by an angle $\alpha$ (or in the second scan about the y-axis by an angle $\alpha$). Due to such an at least twofold scan with different scan planes, relatively complex undercuts or comparative structures can be completely or mostly completely illuminated, and thus measured, according to the invention. In the context of this embodiment, the term "moved through the internal space at least twice" means that the laser scanner scans the internal space using said two different scan planes. The laser scanner can here be physically moved twice in a row through the internal space, wherein it is set during both movements to the two different scan planes with different tilt angles out of the yz-plane of the coordinate system of the internal space. Within the context of the invention it is also possible, however, for the laser scanner to be physically moved just once through the internal space and, in the process, for the internal space to be scanned in the at least two different scan planes in an alternating fashion (preferably in a quickly alternating fashion in relation to the movement speed of the laser scanner). It is possible in a discontinuous movement of the laser scanner between the scanning operations for the laser scanner to carry out two profile scans in the different scan planes from a single location and then to be moved into its next measurement position. All of these variants are comprised in the formulation "moved through the internal space at least twice". In a discontinuous movement of the laser scanner, the movement is preferably stopped while a scan in a plane is taking place. In this method of operation, planes are scanned; the distance between two scan planes corresponds to the travel path of the laser scanner between two scanning operations. Due to the design of a laser scanner, it is possible under certain circumstances that not the entire 360° segment of a scan plane is scanned; because of a web for example on the scanner housing, the scan angle can be limited to, for example, about 320°. In this case, the shadowing region of the laser scanner is preferably positioned such that the shadowing takes place toward a region of the internal space which is not of interest from a measurement-technological point, for example toward the aircraft floor. If the scan planes are scanned during a continuous movement of the laser scanner, a helix is scanned as a result. For practical reasons (speed), such a helix scanning operation is generally preferred.

The scan plane can be tilted according to the invention out of the yz-plane of the coordinate system of the internal space by an angle of 5 to 50°, preferably 5 to 30°, more preferably 5 to 20°, particularly preferably 5 to 15°. Tilting is carried out preferably at least at an angle $\alpha$ about the y-axis, that is to say the horizontal axis perpendicular to the longitudinal direction x, and/or an angle $\gamma$ about the z-axis. An angle of 5 to 15°, in particular for example approximately 10°, is preferred, since this angle range is particularly suitable for sufficiently illuminating conventional undercuts and also for avoiding the incidence of the measurement beam onto the areas to be measured of the internal space at a very shallow angle, which increases the measurement error. It may be preferred within the context of the invention to carry out tilting by the stated angular magnitudes exclusively about the y-axis (angle $\alpha$). The angle can be matched depending on the desired measurement accuracy and type and depth of any undercuts to be illuminated. The scan plane is preferably tilted out of the yz-plane in the two scans in different directions of the x-axis. For example, it can be tilted out of the yz-plane in a first scan by α=10° toward the front (in a transport means in the direction of travel), in a second scan toward the rear by the same magnitude of the tilt angle (−α).

Conventional transport means such as aircraft are frequently mirror-symmetrical with respect to an xz-plane of their coordinate system, that is to say a mirror plane which extends through the longitudinal axis and vertical axis. It is possible within the context of the invention to arrange the travel path of the laser scanner centrally in the internal space, that is to say such that it extends in the mirror plane. It is, however, also possible according to the invention to move in the two scans the scanner on different travel paths, for example on different sides of such a mirror plane, if it is present. It is possible in particular that the two travel paths are straight lines which are mutually parallel and extend substantially mirror-symmetrically with respect to the mirror plane xz of the internal space. It is also possible according to the invention, however, for the two travel paths or movement axes to have different distances from the center line of the internal space. In a mirror-symmetrical internal space, said center line extends in the mirror plane xz of the internal space. Moving the laser scanner in this manner on two travel paths at a distance from the center axis of the internal space facilitates the illumination even of undercuts which extend laterally (in the direction of the y-axis).

According to another aspect of the invention, the method according to the invention is carried out in an aircraft fuselage having a floor and an outer skin which extends substantially in the shape of a circular segment above the floor and is provided with radially extending frames.

One problem which is common in practice is the measurement of an internal aircraft space for reasons of designing a cabin interior or fittings in the cabin. Frequently, when designing so-called business jets or VIP jets, fittings designed to customer specifications are designed which must match exactly the internal dimensions of the fuselage.

The fuselage of commercial aircraft which serve as a basis for such fittings is usually divided, by way of a floor, into an upper region (the cabin) and a fuselage region which is located underneath the floor and serves, for example, as cargo hold, for holding control lines and the like. When measuring an internal aircraft space for reasons of preparing an individual design, it is important to measure the outer cabin skin and the installations above the floor which are present there. In specific cases, the region under the floor may also be of interest. This is particularly the case if design alterations in the cargo holds, or system installations in the floor support region are desired.

Moreover, scanning the outer structures can also be useful for planning antennas and the like.

An aircraft fuselage usually has on the inside frames which extend radially at prespecified axial distances and a skin which is reinforced with radially arranged, axially extending stringers and together give the fuselage the desired stiffness. When designing an interior design, it is important to measure not just the contour of the outer skin but also the contours of the frames.

In order to achieve a high degree of measurement accuracy, the laser beam should strike the surface to be measured as perpendicularly as possible or at a shallow angle. Striking at an acute angle increases the measurement inaccuracy.

The inner surface of the outer skin of an aircraft fuselage and also the surfaces of the frames, which extend in the axial direction of the aircraft fuselage, are usually approximately at right angles with respect to one another. The measurement beam should strike both these surfaces at as obtuse an angle as possible, which poses a problem in the case of surfaces which are at right angles with respect to one another in principle.

According to another aspect of the invention, the parameters:
tilt angle α about the y-axis,
tilt angle γ about the z-axis,
relative position of the laser scanner with respect to the axis of rotational symmetry of the outer skin which extends substantially in the shape of a circular segment above the floor,
are therefore selected when measuring an aircraft fuselage of that type such that, during the scanning operation, as large a surface area as possible both of the inner surfaces of the outer skin, which extend in the radial direction, and of those surfaces, which extend in the axial direction, of the frames is struck by the laser beam at an angle which deviates at most 60° from the perpendicular, preferably at most 50° from the perpendicular, more preferably at most 45° from the perpendicular.

The invention has recognized that the surface areas both of the inside of the outer skin (which substantially extends in the radial direction) and of the axial surfaces of the frames, which are struck at a point angle which is unfavorable in terms of measurement accuracy, can be minimized using a suitable selection of the angles α, γ and with appropriate offset of the laser scanner from the axis of rotational symmetry of the outer skin which extends substantially in the shape of a circular segment above the floor (in the case of fuselages which are not exactly in the shape of a circular segment, the corresponding center axis rather than the axis of rotational symmetry is selected as reference axis). It is thus possible according to the invention to maximize the surface areas which are struck at an angle which deviates at most 60° from the perpendicular, preferably at most 50° from the perpendicular, more preferably at most 45° from the perpendicular. Examples of the concrete method of this optimization and the selection of suitable parameters can be found in the exemplary embodiment. Frequently it will be preferred if, during measurement of such an aircraft fuselage with frames, the magnitude of the tilt angle α and/or the magnitude of the tilt angle γ is between 15 and 75°, preferably between 30 and 60°.

An arrangement according to the invention for carrying out the method can have a base with travel paths (for example rails) for a laser scanner which are arranged thereon, which has means for connecting to the seat rails in the cabin floor of a transport means, such as an aircraft. It is possible in this manner for the travel path of the laser scanner to be mounted quickly and easily into a defined position in an aircraft. It is preferred according to the invention if the laser scanner can carry out the measurement method autonomously in the absence of operating staff. This avoids the occurrence of torsions or other deformation of the structure to be measured caused for example by the presence of operating staff in the aircraft cabin. It is further preferred if the laser scanner is also autonomous with respect to the power supply and carries a power source such as a battery. As an alternative, power may be supplied for example by way of the travel path (for example the rails).

BRIEF DESCRIPTION OF THE DRAWINGS

One exemplary embodiment of the invention will be explained below with reference to the drawings, in which:

FIG. 5: schematically shows a cross section through an aircraft cabin, that is to say the part of the aircraft fuselage above the floor;

DETAILED DESCRIPTION OF THE INVENTION

Figure 1:
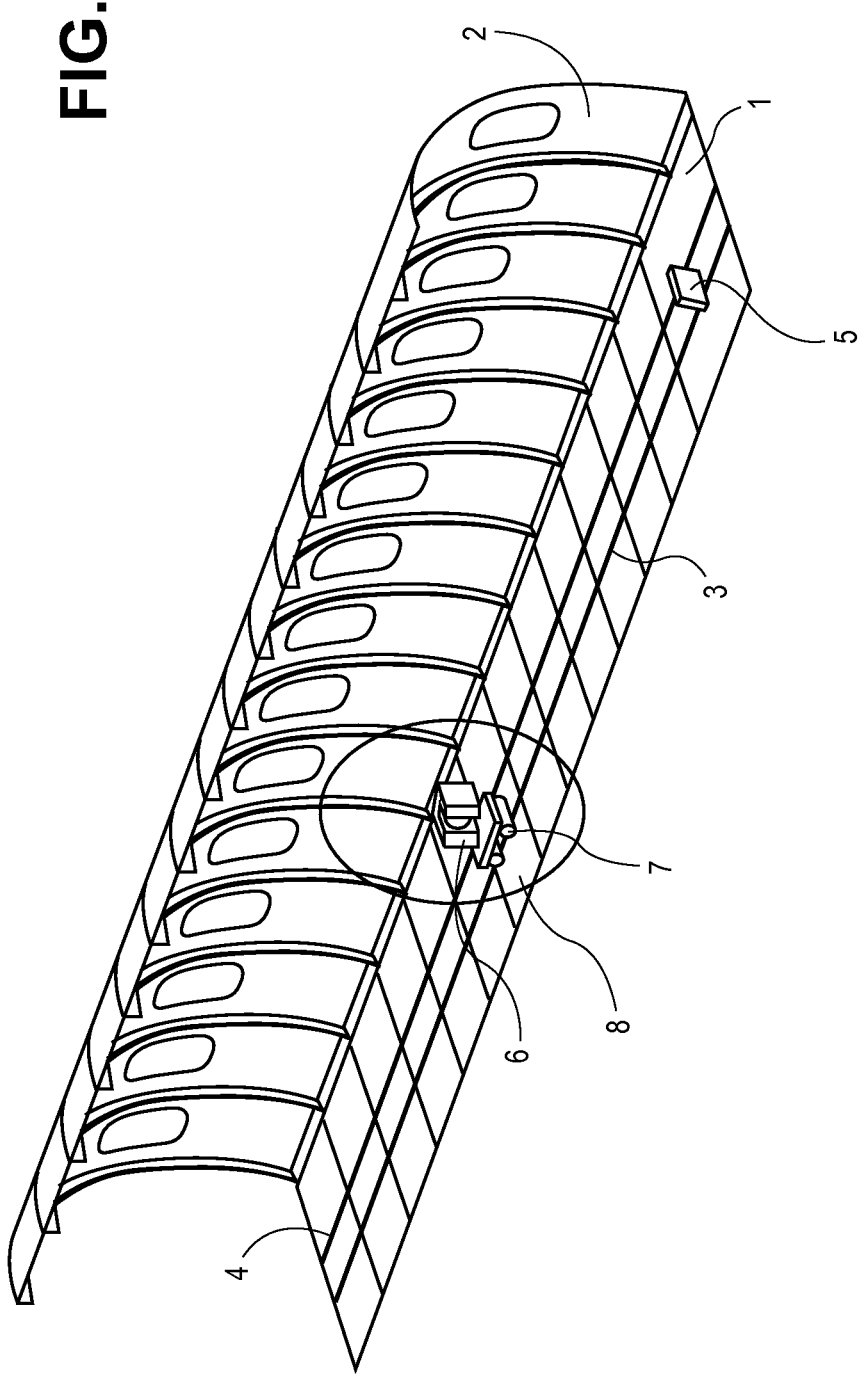
FIG. 1: schematically shows a section of an aircraft cabin having an apparatus for carrying out the method according to the invention.

FIG. 1 shows in a section the internal space of an aircraft cabin with the cabin floor 1 and the outer skin 2 of the fuselage with the frames 12. This aircraft cabin is intended to be measured in order to prepare interior design.

Arranged on the cabin floor 1 for carrying out the measurement are two guidance rails 3, 4 which in each case extend substantially parallel to the longitudinal axis of the cabin. The two guidance rails 3, 4 are arranged on different sides of the plane of symmetry which extends in the direction of the longitudinal axis in the xz-plane through the aircraft cabin.

Figure 2:
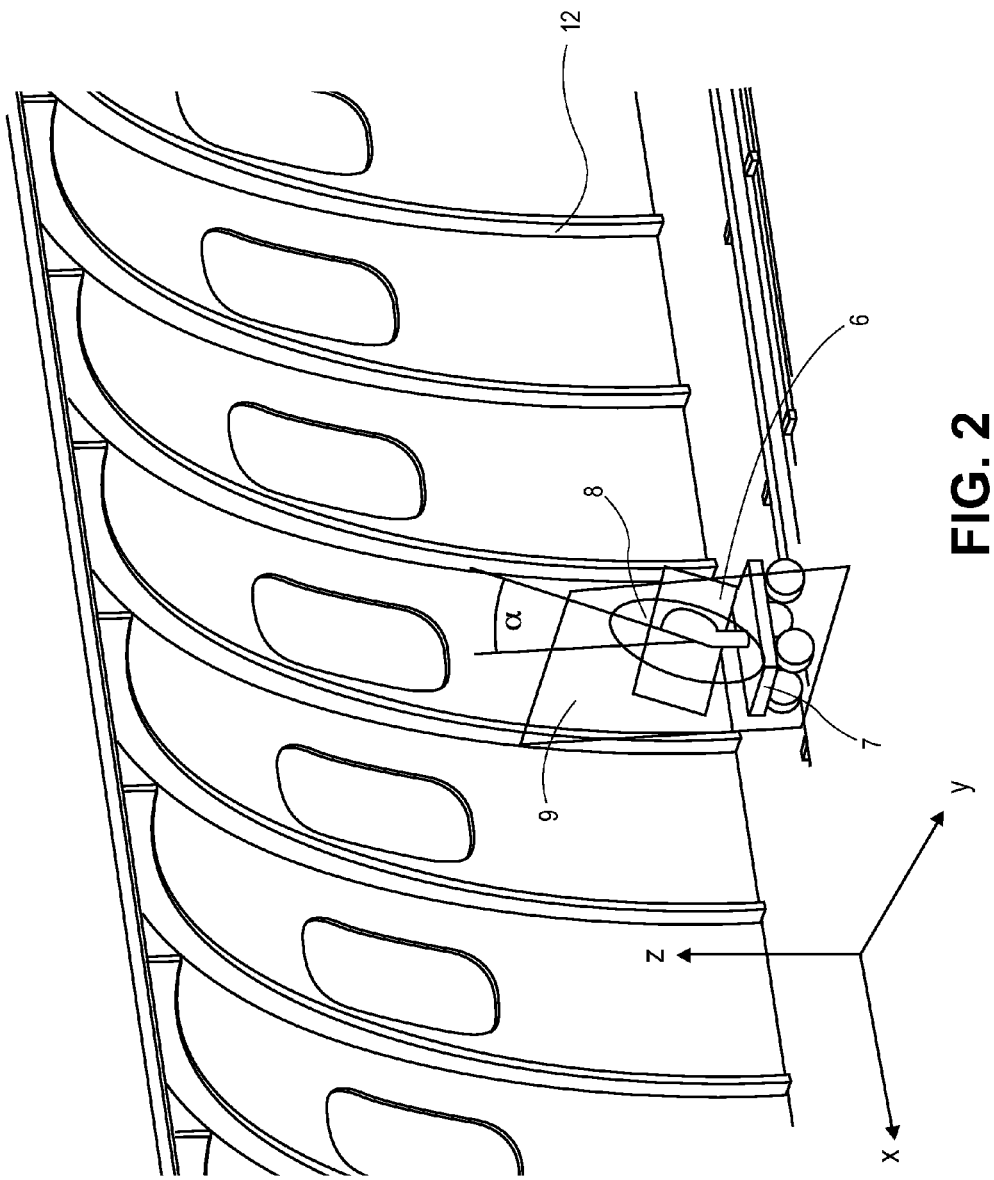
FIG. 2: shows a detail from FIG. 1.

Arranged in a stationary manner at a known reference location inside the aircraft cabin is an optical positioning system such as a laser tracker 5. It is used as a reference for determining the location of a laser scanner 6 which is movably arranged on a self-driving carriage 7. The laser scanner 6 is configured for carrying out so-called profile scans in which the measurement beam for the measurement operation rotates gradually about an axis perpendicular to the beam direction and thus a measurement is carried out in a plane 8. It can be seen in particular in FIG. 2 that said scan plane 8 is inclined with respect to the plane 9, which is spanned by the y-axis and z-axis of the coordinate system of the internal space, by an angle $\alpha$.

In order to carry out a measurement, the carriage 7 is placed onto one end of the guidance rail 3. The internal space is then scanned in the scan plane 8. During the slow movement of the carriage 7 along the rail 3, said scan plane 8 is moved through the entire internal space to be measured, with the result that said internal space is measured. The location of the carriage 7 during the measurement operation is determined using the laser tracker 5.

In a second step, the carriage 7 is placed onto the guidance rail 4, which extends in a parallel fashion, and the measurement operation is repeated. In this second measurement operation, the scan plane 8 is tilted such that it together with the yz-plane 9 now encloses the angle $-\alpha$. In this second scan operation, the internal space is thus measured with a different scan plane.

Figure 3:
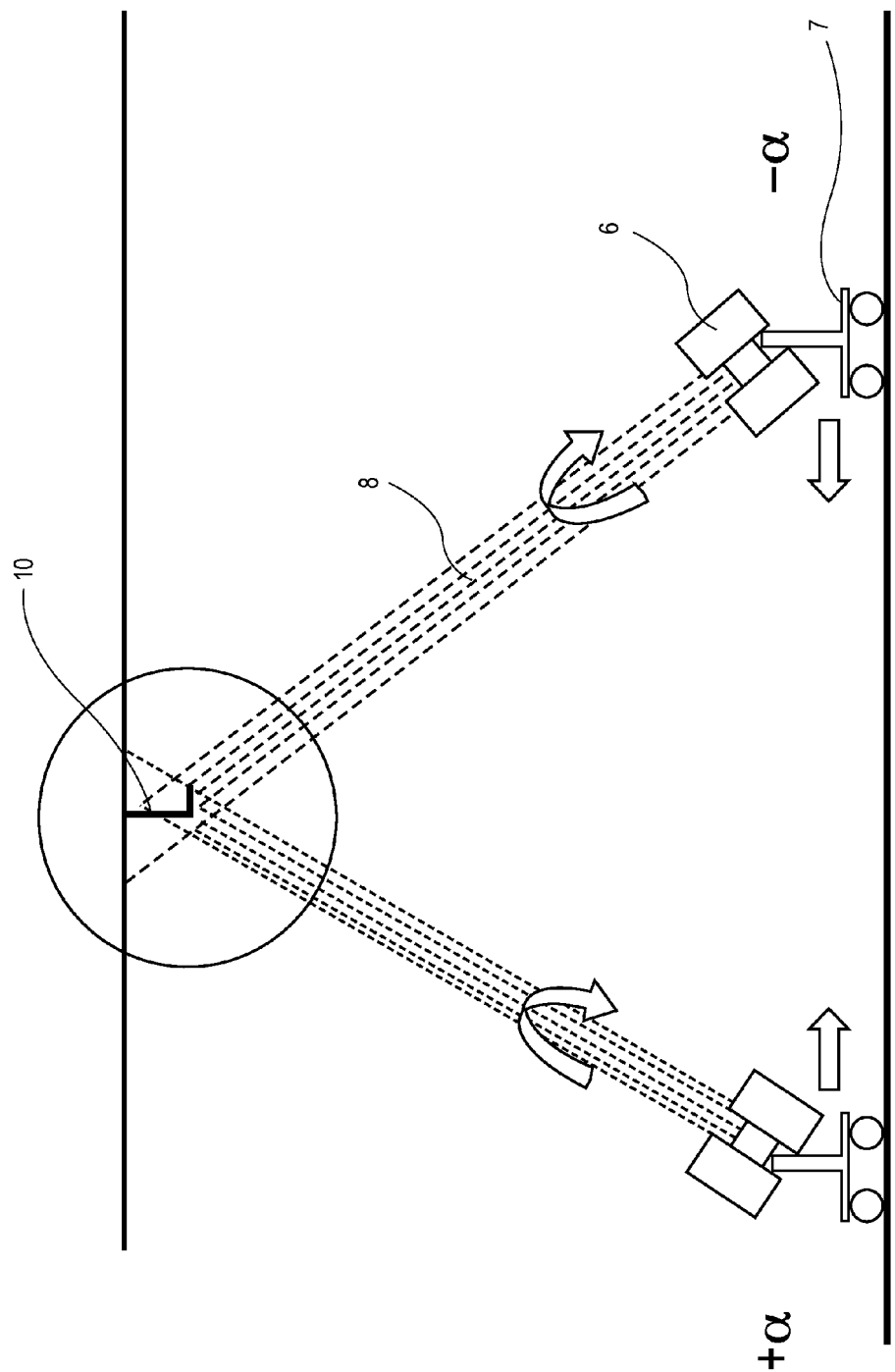
FIG. 3: schematically shows the mode of operation of the method according to the invention for illuminating undercuts.
Figure 4A:
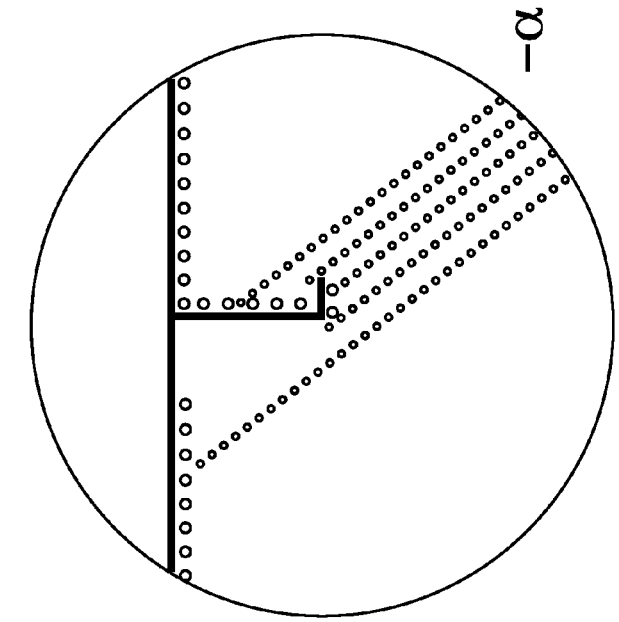
FIGS. 4A, 4B and 4C depict details from FIG. 3.
Figure 4B:
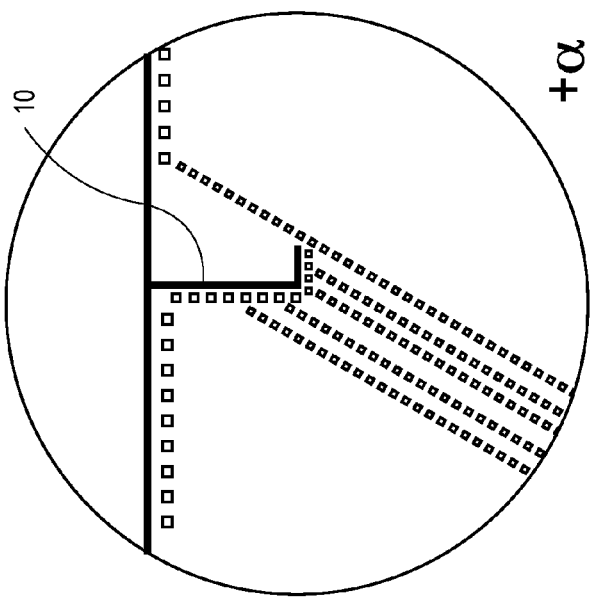
Figure 4C:
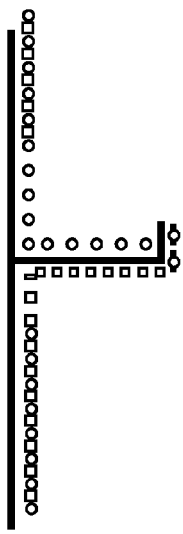

It can be seen in FIGS. 3 and 4 that an undercut structure 10 in the internal space of the aircraft can be illuminated substantially completely and thus measured if two scans are carried out with scan planes 8 being inclined with respect to each other.

An undercut structure 10 can be seen in FIGS. 3 and 4 on the cabin ceiling. In the first measurement operation, in which the scan plane 8 together with the yz-plane 9 encloses the angle $\alpha$, part of this undercut structure 10 is shadowed and, accordingly, not completely illuminated and measured, as can be seen, in particular, in FIG. 4. In the second measurement operation, the scan plane 8 together with the yz-plane 9 encloses the angle $-\alpha$ with the result that now the previously shadowed region is illuminated and measured, as can be seen in the right-hand half of FIG. 4. By measuring twice with in each case differently inclined scan planes, the undercut structure 10 is thus completely, or at least mostly, captured.

The scan data obtained during the scan operation can either be stored in the laser scanner 6 and be read out for evaluation purposes when the measurement is complete or, in the alternative, can be transmitted during the measurement, preferably in a wireless fashion, to an evaluation unit. The measurement points obtained can then be converted into the coordinate system of the internal space to be measured by means of the tracking information of the laser tracker 5. The point clouds thus obtained can then be used to calculate the three-dimensional coordinates of the internal space to be measured, preferably in mesh representation.

FIGS. 5 to 12 describe the aspect of the invention which deals with the optimization of the scan operation of an aircraft cabin which has radially extending frames.

The arrow R (shown in FIG. 5) shows the radius of the fuselage segment of an aircraft above the cabin floor 11. The positioning of the laser scanner 6 relative to said radius center point is described by the following parameters:

a: height of the radius center point above the cabin floor (in the direction of the z-axis of the coordinate system)

c: horizontal distance of the laser scanner 6 from the radius center point in the radial direction (y-axis)

h: height of the laser scanner 6 above the cabin floor 11 (in the direction of the z-axis).

During a scan, the scanner is positioned in the internal aircraft space and this position can be described by the above-described parameters a, c, h. In order to carry out the scan operation, it is then moved parallel to the x-axis.

The scan plane 8 can be tilted out of the yz-plane 9 by the angles $\alpha$, $\gamma$ (as defined above). During the scan operation, the laser beam is allowed to rotate in the scan plane 8, which is defined by the tilt angles $\alpha$, $\gamma$, relative to the yz-plane 9, and this rotational operation is described by the circumferential angle $\omega$. The directions of the circumferential angle $\omega$ with the magnitudes 0°, 90°, 180° and 270° are shown in FIG. 5. In the case of a circumferential angle $\omega=180°$, the laser beam thus points upward without necessarily having to be parallel with respect to the z-axis since it can be tilted, after all, out of the yz-plane by the tilt angles $\alpha$, $\gamma$.

When measuring an aircraft fuselage having radial frames, the measuring operation should be optimized such that the cabin skin 2 and also the axial surfaces of the frames 12 are struck at as obtuse an angle as possible. According to the invention, the scan operation can be simulated using a mathematical model before the actual (generally complex) operation in order to determine which parameter combination a, c, h, $\alpha$, $\gamma$ gives the best possible "illumination" of the aircraft cabin for the given purpose. A simulation can be carried out by using conventional mathematics software such as MATLAB (www.mathworks.de).

FIGS. 6 to 10 show various simulation results for the example of a fuselage geometry similar to an Airbus A310 (radius R=2650 mm). Plotted in the figures are in each case horizontally the circumferential angle $\omega$ and vertically the angle of incidence of the laser beam onto the cabin skin 2, which extends in the radial direction, and also the axial surfaces of the frames. The following parameters were selected for the example in FIG. 6:

a=200 mm c=500 mm h=300 mm $\alpha=30°$ $\gamma=-20°$

Figure 6:
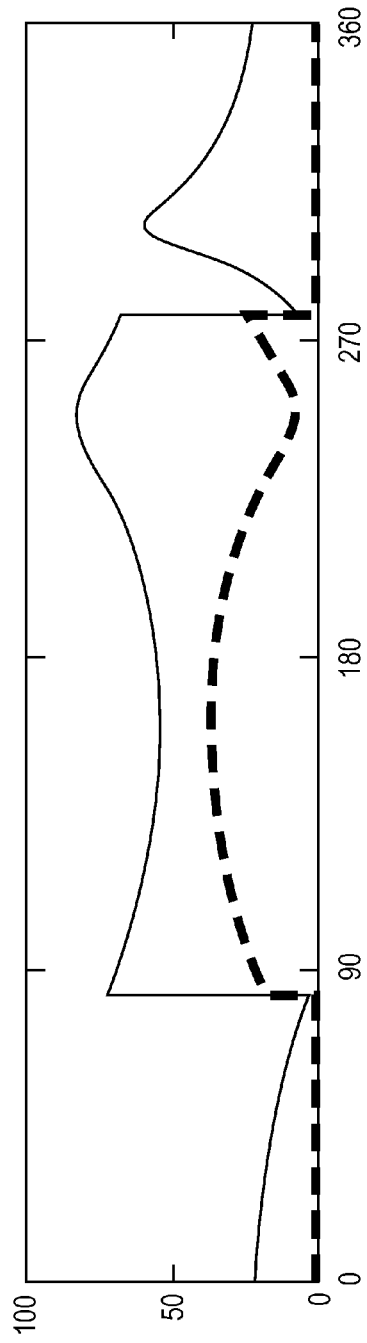
FIGS. 6 to 12: schematically show the calculated angles of incidence of the laser beam onto the inside of the outer skin of the fuselage or the floor and also the axial surfaces of the frames for various combinations of tilt angles and scanner positions. The dashed line shows the angle of incidence onto the frame surfaces, the continuous line shows the angle of incidence onto the skin surfaces.

FIG. 6 shows firstly that the curves of the angles of incidence in each case have a point of discontinuity at just under 90° and just above 270° (circumferential angle ω). This point of discontinuity marks the transition of the laser beam from the cabin skin 2 to the cabin floor 11. Generally, it is the cabin skin rather than the cabin floor which should be measured with a high degree of accuracy, with the result that suitable (obtuse) angles of incidence in particular in the region between these two points of discontinuity must be ensured.

FIG. 6 shows that the curves of the angles of incidence onto cabin skin and axial surfaces of the frames are mirrored horizontally about the angular position of 45°. This can be explained by the right-angled arrangement of cabin skin 2 and axial surfaces of the frames 12 with respect to one another. Since the scanner is assumed for the purposes of this simulation to be not in the center of the cabin floor but rather off-center (c=500 mm), the curves of the angles of incidence are not symmetrical with respect to one another by ω=180°.

FIG. 6 shows that the cabin skin is struck continuously at an obtuse circumferential angle of approximately 50° or above. On the other hand, the axial surfaces of the frames are struck at more acute angles by comparison.

FIGS. 7 to 12 show further simulation calculations for other scanner positions or tilts of the scan plane. It is assumed in FIGS. 7 to 10 that the scanner is positioned in the center of the cabin (c=0).

Figure 7:
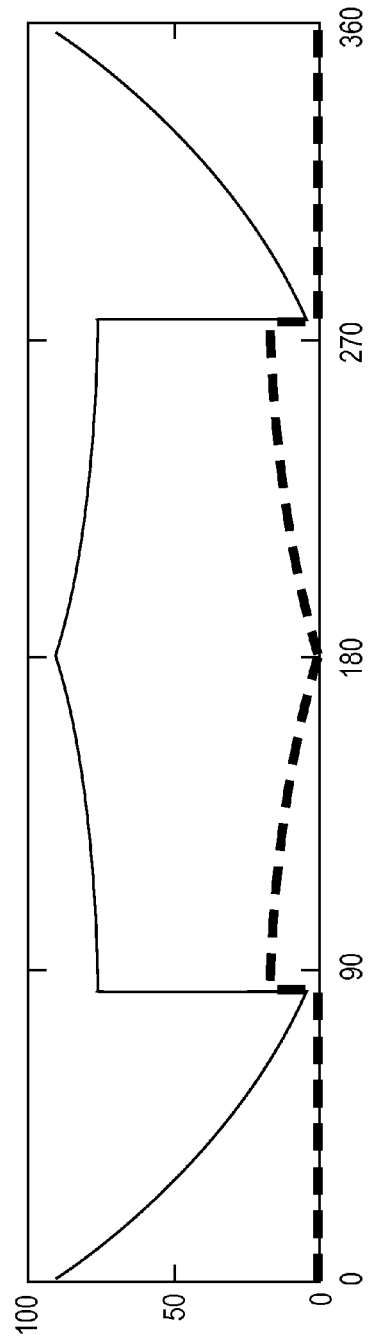

The tilt of the scan plane is assumed to be α=0°, γ=−15° in FIG. 7. It shows that the cabin skin 2 is here struck at obtuse angles in principle, but that the axial surfaces of the frames are struck at more acute angles by comparison, and the angle of incidence for the circumferential angle ω=180° amounts to the value of 0°.

Figure 8:
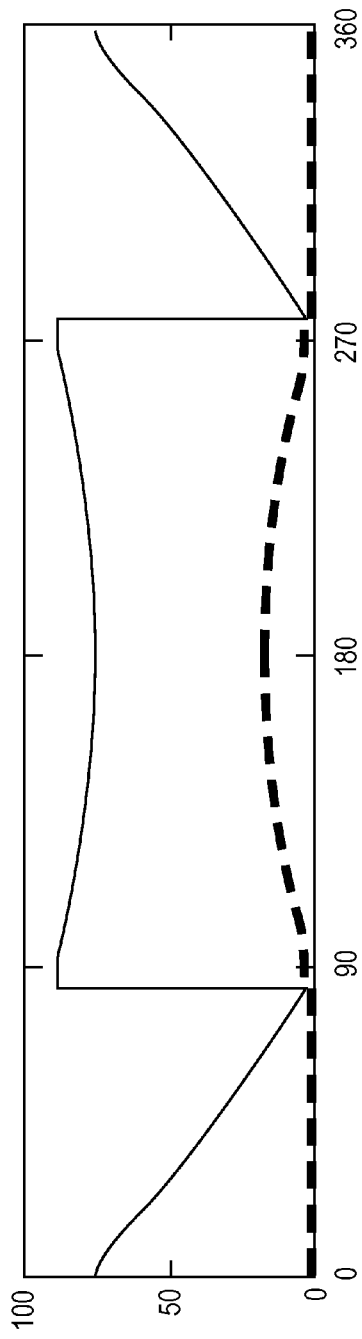

FIG. 8 shows the simulation for a tilt of the scan plane with the values α=15°, γ=0°. Here, too, the cabin skin is once again struck at obtuse angles, but the axial surfaces of the frames in more acute angles which for the circumferential angle ω of 90 and 270° again amount to the value 0°.

Figure 9:
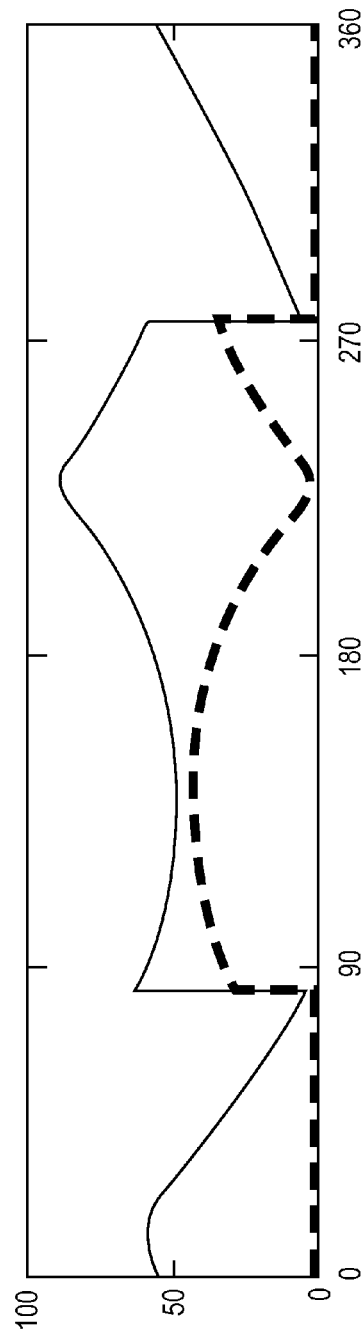
Figure 10:
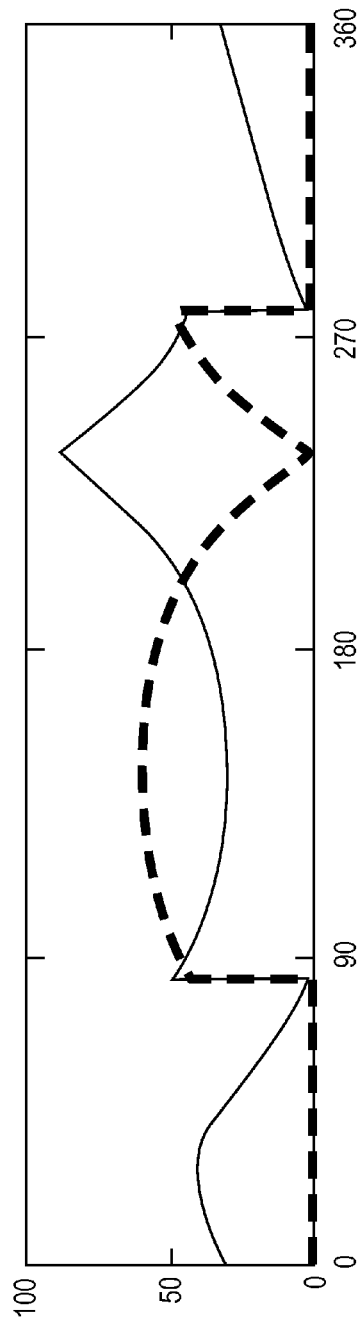

FIGS. 9 and 10 show that a more pronounced tilt of the scan plane leads to a more uniform illumination of the cabin skin and also of the axial surfaces of the frames. In the simulation of FIG. 9, the tilt values are α=30°, γ=−30°, in the simulation in FIG. 10 the corresponding values are α=45°, γ=−45°. A relatively uniform illumination of cabin skin and frames at obtuse or still acceptably acute angles of incidence results here from comparatively larger ranges of the circumferential angle ω. However, even here there are places where the angle of incidence onto the axial surfaces of the frames is 0°.

Figure 11:
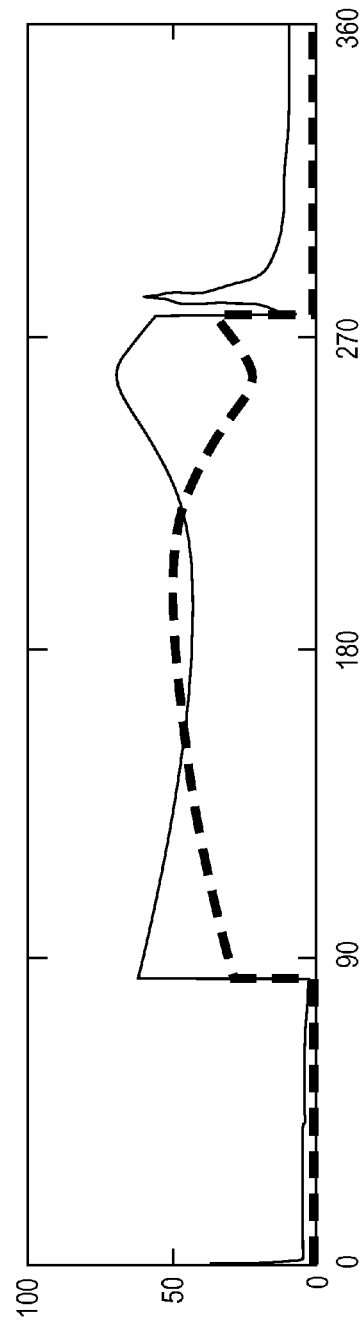
Figure 12:
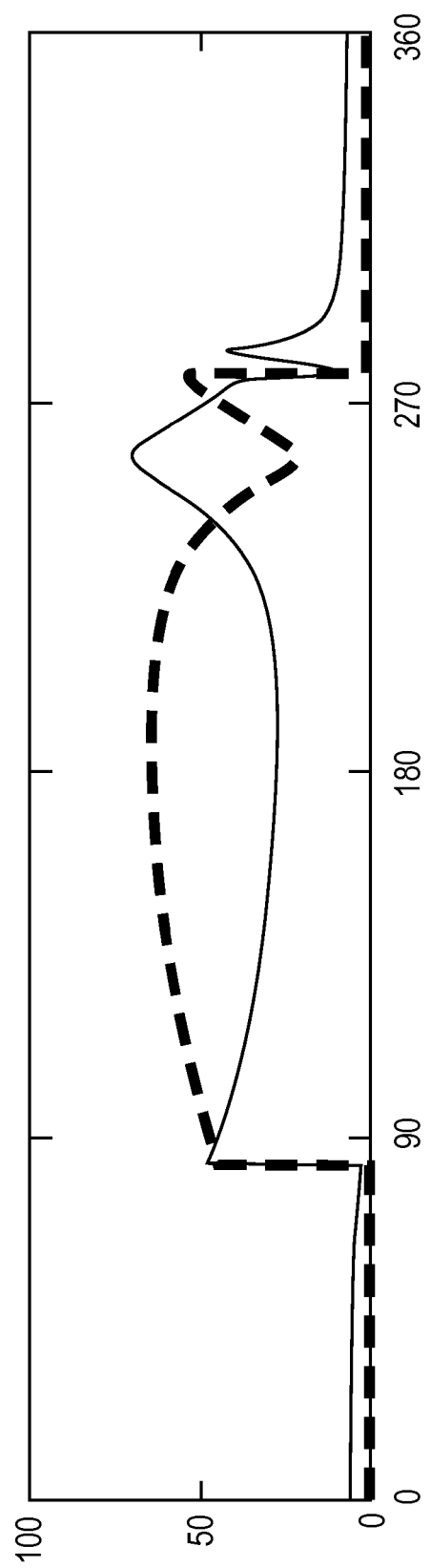

FIGS. 11 and 12 show that a further improvement can be achieved by an off-center scanner position (c not equal to 0). The FIG. 11 shows such a simulation for tilt angle α=30°, γ=−30°, FIG. 12 for tilt angle α=45°, γ=−45°. It can be seen that across the entire circumferential angle range between the points of discontinuity (that is to say during scanning of the cabin skin 2) both cabin skin and axial surfaces of the frames are scanned at obtuse or acceptably acute angles.

The figures show that in the exemplary embodiment described for the case of a central scanner position, a tilt angle range of α=45°, γ=−45° leads to a comparatively balanced measurement result. A central scanner position can sometimes be specified for practical reasons if a travel path for the scanner cannot be mounted, or cannot readily be mounted, off-center. If off-center arrangement of the scanner is possible, magnitudes of the tilt angles α, γ in the range 30 to 35° can lead to balanced results. It is also possible according to the invention to repeat the measurement with different parameters, for example in order to repeat an angle range of the circumferential angle ω, which has led in the first measurement in the region of cabin skin and/or frame to unacceptably acute angles of incidence, with a suitably different setting of the parameters.

The simulation offers a good planning basis for the scan (efficient use with predictable quality and optimum matching to the individual question). It can be useful depending on the object geometry to expand the calculation.

The invention claimed is:

1. A method for measuring internal space of an elongate body having a longitudinal axis x in a global xyz-coordinate system, comprising:
    moving a laser scanner, which carries out scans in a plane, through the internal space of the elongate body to perform a laser profile scan of the internal space,
    wherein the laser scanner is tilted to provide a scan plane that is tilted about a y-axis by a tilt angle α or about a z-axis by a tilt angle γ.

2. The method of claim 1, wherein the laser scanner is moved through the internal space along an axis which is substantially parallel to the longitudinal axis x.

3. The method of claim 1, comprising moving the laser scanner at least twice through the internal space and tilting the scan plane, in both scans, by a different angle α or γ out of the coordinate system of the internal space.

4. The method of claim 3, wherein the laser scanner in the first and second scans is moved through the internal space along two different axes.

5. The method of claim 1, wherein the scan plane is tilted out of the yz-plane of the coordinate system of the internal space by an angle α or γ of 5 to 50°.

6. The method of claim 3, wherein the scan plane is tilted in a first scan in a first direction of the x-axis about the y-axis or the z-axis and in a second scan in the other direction of the x-axis about the y-axis or the z-axis out of the yz-plane.

7. The method of claim 6, wherein a magnitude of the tilt angle α or γ is the same in the first and second scans.

8. The method of claim 4, wherein the two different axes are substantially mutually parallel and parallel with respect to the longitudinal axis x of the internal space, and are arranged either substantially mirror-symmetrically with respect to a plane which extends through the longitudinal axis x of the internal space or have differing distances from the center line of the internal space.

9. The method of claim 1, wherein the movement of the laser scanner is discontinuous and the scanning of one or more scan planes takes place in the movement pauses of the laser scanner.

10. The method of claim 1, wherein the movement of the laser scanner and the scanning of one or more scan planes take place at the same time.

11. The method of claim 1, wherein the elongate body is an aircraft fuselage having a floor and an outer skin which extends substantially in the shape of a circular segment above the floor and is provided with radially extending frames.

12. The method of claim 11, wherein the tilt angle α about the y-axis, the tilt angle γ about the z-axis, and a relative position of the laser scanner with respect to the axis of rotational symmetry of the outer skin which extends substantially in the shape of a circular segment above the floor are such that, during the scanning operation, as large a surface area as possible both of the inner surfaces of the outer skin, which extend in the radial direction, and of those surfaces, which extend in the axial direction, of the frames is struck by the laser beam at an angle which deviates at most 60° from the perpendicular.

13. The method of claim 12, wherein the magnitude of the tilt angle α is 15 to 75°.

14. The method of claim 12 or 13, wherein the magnitude of the tilt angle γ is 15 to 75°.

15. The method of claim 12, wherein the angle deviates at most 50° from the perpendicular.

16. The method of claim 12, wherein the angle deviates at most 45° from the perpendicular.

17. The method of claim 12, wherein the magnitude of the tilt angle α is 30 to 60°.

18. The method of claim 12 or 13, wherein the magnitude of the tilt angle γ is 30 to 60°.

19. The method of claim 1, wherein the y-axis and the z-axis correspond to the xyz-global coordinate system of the internal space.

20. The method of claim 1, wherein the scan plane is tilted out of the yz-plane of the coordinate system of the internal space by an angle α or γ of 5 to 30°.

21. The method of claim 1, wherein the scan plane is tilted out of the yz-plane of the coordinate system of the internal space by an angle α or γ of 5 to 20°.

22. The method of claim 1, wherein the scan plane is tilted out of the yz-plane of the coordinate system of the internal space by an angle α or γ of 5 to 15°.

23. The method of claim 1, wherein the movement of the laser scanner is continuous.

\* \* \* \* \*